(12) United States Patent
Fielding et al.

(10) Patent No.: US 6,381,227 B1
(45) Date of Patent: *Apr. 30, 2002

(54) FRAME RELAY PROTOCOL-BASED MULTIPLEX SWITCHING SCHEME FOR SATELLITE MESH NETWORK

(75) Inventors: Dennis E. Fielding, Melbourne; Todd W. Gross, Palm Bay, both of FL (US)

(73) Assignee: Gilat Florida Inc., West Melbourne, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/786,234

(22) Filed: Jan. 21, 1997

Related U.S. Application Data (63) Continuation of application No. 08/499,766, filed on Jul. 7, 1995, now abandoned, which is a continuation of application No. 08/079,250, filed on Jun. 17, 1993, now Pat. No. 5,434,850.

(51) Int. Cl.[7] .............................................. H04B 7/155
(52) U.S. Cl. ....................................... 370/321; 370/349
(58) Field of Search ................................ 370/229, 327, 370/328, 345, 349, 321, 336

(56) References Cited

U.S. PATENT DOCUMENTS

| | | | |
|---|---|---|---|
| 3,634,628 A | 1/1972 | Sekimoto et al. | 179/15 BS |
| 3,643,034 A | 2/1972 | Burns et al. | 179/27 D |
| 3,662,110 A | 5/1972 | Van Fossen et al. | 179/2 TV |
| 3,683,116 A | 8/1972 | Dill | 179/15 AQ |
| 3,701,849 A | 10/1972 | Stapleton | 179/2 TV |
| 4,018,993 A | 4/1977 | Edström | |
| 4,135,156 A | 1/1979 | Sanders et al. | 325/4 |
| 4,181,886 A | 1/1980 | Cooperman | 325/4 |
| 4,225,884 A | 9/1980 | Block et al. | |
| 4,285,064 A | 8/1981 | Hodge | 455/13 |
| 4,301,533 A | 11/1981 | Acampora et al. | 370/104 |
| 4,307,461 A | 12/1981 | Brickman et al. | 370/58 |

(List continued on next page.)

FOREIGN PATENT DOCUMENTS

| | | |
|---|---|---|
| EP | 0 324 363 A2 | 1/1989 |
| EP | 0 535 890 A2 | 9/1992 |

OTHER PUBLICATIONS

Newton, Harry, Newton's Telecom Dictionary, 9th Edition, Flatiron Publishing, Inc., p. 709, Sep. 1995.*
Stan Prentiss, "Satellite Communications", Tab Books Inc., pp. 23–29, 1983.*
A. Platt and M.J. Morse, "Some Aspects of Traffic Management in Frame Relay Networks,"UK Teletraffic Symposium, 1991 8th IEE, pp. 23/1 to 23/6, 1991.*

(List continued on next page.)

*Primary Examiner*—Melvin Marcelo
(74) *Attorney, Agent, or Firm*—Banner & Witcoff, Ltd.

(57) ABSTRACT

A frame relay protocol-based earth station interface architecture provides full mesh connectivity for a relatively small number of network stations. The fundamental component of the architecture is a frame relay protocol-based switch, which employs a network interface 'frame relay' standard to define the multiplexing of multiple virtual ports across single physical communications port. Through address and control fields of its connectivity control software, the frame relay protocol-based switch can be dynamically configured to provide multilayer addressing and device selectivity, thereby enabling point-to-point connectivity of multiple terminal devices, such as a plurality of audio circuits, to be effected via a single port. Dial codes on the station side of an audio signal multiplexer link are translated into frame relay addresses (data link connection identifiers) that are added to each frame of data for routing through the network. With this additional layer of routing information, audio (voice) connectivity is now available between any two audio circuits (e.g. trunks) in the network.

163 Claims, 4 Drawing Sheets

U.S. PATENT DOCUMENTS

| | | |
|---|---|---|
| 4,319,353 A | 3/1982 | Alvarez, III et al. ........ 370/104 |
| 4,320,504 A | 3/1982 | Alvarez, III et al. ........ 370/104 |
| 4,328,543 A | 5/1982 | Brickman et al. .......... 364/200 |
| 4,330,857 A | 5/1982 | Alvarez, III et al. ........ 370/104 |
| 4,332,026 A | 5/1982 | Alvarez, III et al. ......... 370/66 |
| 4,346,470 A | 8/1982 | Alvarez, III et al. ........ 370/104 |
| 4,377,793 A | 3/1983 | Horna ........................ 333/165 |
| 4,381,562 A | 4/1983 | Acampora .................... 370/97 |
| 4,468,727 A | 8/1984 | Carrison et al. ............ 364/200 |
| 4,485,478 A | 11/1984 | Takada ......................... 375/60 |
| 4,507,781 A | 3/1985 | Alvarez et al. ............. 370/104 |
| 4,516,156 A | 5/1985 | Fabris et al. .................. 358/85 |
| 4,521,879 A | 6/1985 | Gueldenpfennig et al. .... 370/62 |
| 4,536,874 A | 8/1985 | Stoffel et al. ................. 370/85 |
| 4,538,073 A | 8/1985 | Freige et al. |
| 4,587,651 A | 5/1986 | Nelson et al. ................. 370/88 |
| 4,597,077 A | 6/1986 | Nelson et al. ................. 370/88 |
| 4,599,647 A | 7/1986 | George et al. |
| 4,636,879 A | 1/1987 | Narita et al. |
| 4,642,806 A | 2/1987 | Hewitt et al. .................. 370/95 |
| 4,644,534 A | 2/1987 | Sperlich ....................... 370/95 |
| 4,663,743 A | 5/1987 | Rampuria et al. |
| 4,665,516 A | 5/1987 | Middleton et al. ............. 370/76 |
| 4,672,602 A | 6/1987 | Hargrave et al. .............. 370/58 |
| 4,679,191 A | 7/1987 | Nelson et al. ................. 370/84 |
| 4,680,688 A | 7/1987 | Inou et al. |
| 4,686,698 A | 8/1987 | Tompkins et al. ............. 379/53 |
| 4,701,907 A | 10/1987 | Collins ........................ 370/63 |
| 4,703,479 A | 10/1987 | Ikeda ......................... 370/104 |
| 4,706,080 A | 11/1987 | Sincoskie ............. 340/825.02 |
| 4,706,081 A | 11/1987 | Hart et al. ............ 340/825.03 |
| 4,710,917 A | 12/1987 | Tompkins et al. ............. 370/62 |
| 4,713,806 A | 12/1987 | Oberlander et al. .......... 370/58 |
| 4,720,850 A | 1/1988 | Oberlander et al. .......... 379/90 |
| 4,720,873 A | 1/1988 | Goodman et al. |
| 4,730,305 A | 3/1988 | Acampora et al. ............ 370/60 |
| 4,736,422 A | 4/1988 | Mason |
| 4,739,510 A | 4/1988 | Jeffers et al. .................. 380/15 |
| 4,747,160 A | 5/1988 | Bossard ........................ 455/33 |
| 4,750,036 A | 6/1988 | Martinez .................... 358/147 |
| 4,751,732 A | 6/1988 | Kamitake |
| 4,769,833 A | 9/1988 | Farleigh et al. ............. 379/105 |
| 4,775,974 A | 10/1988 | Kobayashi |
| 4,777,657 A | 10/1988 | Gillaspie |
| 4,792,948 A | 12/1988 | Hangen et al. ................ 370/95 |
| 4,797,589 A | 1/1989 | Collins ........................ 370/63 |
| 4,797,878 A | 1/1989 | Armstrong .................... 370/96 |
| 4,797,919 A | 1/1989 | Murray et al. |
| 4,811,338 A * | 3/1989 | Haruyama et al. .......... 370/520 |
| 4,813,039 A | 3/1989 | Yoshihiro |
| 4,829,569 A | 5/1989 | Seth-Smith et al. |
| 4,847,829 A | 7/1989 | Tompkins et al. ............. 370/62 |
| 4,847,892 A | 7/1989 | Shelley |
| 4,858,225 A | 8/1989 | DeSantis ...................... 370/50 |
| 4,868,811 A | 9/1989 | Suzuki ......................... 370/50 |
| 4,876,737 A | 10/1989 | Woodworth et al. |
| 4,879,711 A | 11/1989 | Rosen ......................... 370/50 |
| 4,888,769 A | 12/1989 | Deal ........................... 370/50 |
| 4,890,280 A | 12/1989 | Hirata |
| 4,894,822 A | 1/1990 | Buhrke et al. ................ 370/60 |
| RE33,189 E | 3/1990 | Lee et al. |
| 4,916,691 A | 4/1990 | Goodman .................... 370/60 |
| 4,916,737 A | 4/1990 | Chomet et al. |
| 4,918,653 A | 4/1990 | Johri et al. |
| 4,933,936 A | 6/1990 | Rasmussen et al. |
| 4,937,825 A | 6/1990 | Ballard et al. ............. 370/20.1 |
| 4,937,866 A | 6/1990 | Crowther et al. |
| 4,939,369 A | 7/1990 | Elabd ......................... 250/332 |
| 4,959,784 A | 9/1990 | Kwapisz |
| 4,959,872 A | 9/1990 | Imai et al. |
| RE33,426 E | 11/1990 | Sugimoto et al. |
| 4,970,721 A | 11/1990 | Aczel et al. ................... 370/92 |
| 4,993,015 A | 2/1991 | Fite, Jr. ....................... 370/16 |
| 4,999,829 A | 3/1991 | Fite, Jr. et al. ............... 370/16 |
| 5,014,267 A | 5/1991 | Tompkins et al. ............. 370/62 |
| 5,016,243 A | 5/1991 | Fite, Jr. ....................... 370/16 |
| 5,018,133 A | 5/1991 | Tsukakoshi et al. |
| 5,019,910 A | 5/1991 | Filmer |
| 5,023,869 A | 6/1991 | Grover et al. ................. 370/84 |
| 5,023,873 A | 6/1991 | Stevenson et al. ........... 371/8.2 |
| 5,027,400 A | 6/1991 | Baji et al. ...................... 380/20 |
| 5,029,163 A | 7/1991 | Chao et al. ................ 370/95.1 |
| 5,029,207 A | 7/1991 | Gammie |
| 5,038,265 A | 8/1991 | Paladel |
| 5,058,138 A | 10/1991 | Figura et al. |
| 5,065,397 A | 11/1991 | Shiobara .................... 370/85.5 |
| 5,077,834 A | 12/1991 | Andros et al. |
| 5,079,764 A | 1/1992 | Orita et al. |
| 5,081,558 A | 1/1992 | Mahler |
| 5,081,621 A | 1/1992 | Sugimoto |
| 5,086,426 A | 2/1992 | Tsukakoshi et al. |
| 5,090,011 A * | 2/1992 | Fukuta et al. ................. 370/60 |
| 5,095,480 A | 3/1992 | Fenner ...................... 370/94.1 |
| 5,101,267 A | 3/1992 | Morales-Garza |
| 5,111,504 A | 5/1992 | Esserman et al. |
| 5,115,433 A | 5/1992 | Baran et al. ................ 370/94.3 |
| 5,121,396 A | 6/1992 | Irvin et al. |
| 5,130,978 A | 7/1992 | Mobasser |
| 5,131,010 A | 7/1992 | Derrenge et al. |
| 5,153,876 A | 10/1992 | Sin ........................... 370/85.1 |
| 5,177,604 A | 1/1993 | Martinez ...................... 358/86 |
| 5,177,788 A | 1/1993 | Schanning et al. |
| 5,184,347 A | 2/1993 | Farwell et al. ............. 370/94.1 |
| 5,191,582 A | 3/1993 | Upp |
| 5,195,090 A | 3/1993 | Bolliger et al. ............. 370/94.1 |
| 5,195,091 A | 3/1993 | Farwell et al. ............. 370/94.1 |
| 5,208,811 A | 5/1993 | Kashio et al. |
| 5,223,923 A | 6/1993 | Morales-Garza |
| 5,224,099 A | 6/1993 | Corbalis et al. ........... 370/94.2 |
| 5,229,990 A | 7/1993 | Teraslinna |
| 5,229,994 A | 7/1993 | Balzano et al. |
| 5,237,564 A | 8/1993 | Lespagnol et al. |
| 5,237,610 A | 8/1993 | Gammie et al. |
| 5,239,545 A | 8/1993 | Buchholz .................... 370/95.3 |
| 5,251,207 A | 10/1993 | Abensour et al. .......... 370/60.1 |
| 5,260,936 A | 11/1993 | Bardet et al. |
| 5,274,643 A | 12/1993 | Fisk ........................... 370/94.1 |
| 5,276,907 A | 1/1994 | Meidan |
| 5,278,892 A | 1/1994 | Bolliger et al. ............... 379/60 |
| 5,280,481 A | 1/1994 | Chang et al. |
| 5,287,535 A | 2/1994 | Sakagawa et al. |
| 5,291,479 A | 3/1994 | Vaziri et al. ............... 370/58.2 |
| 5,291,492 A | 3/1994 | Andrews et al. .......... 370/110.1 |
| 5,295,133 A | 3/1994 | Jurkevich .................... 370/16 |
| 5,295,137 A | 3/1994 | Jurkevich .................... 370/16 |
| 5,301,273 A | 4/1994 | Konishi |
| 5,301,358 A | 4/1994 | Gaskill et al. |
| 5,303,042 A | 4/1994 | Lewis et al. |
| 5,303,237 A | 4/1994 | Bergman et al. ........... 370/85.6 |
| 5,305,308 A | 4/1994 | English et al. ............. 370/32.1 |
| 5,305,385 A | 4/1994 | Schanning et al. |
| 5,307,348 A | 4/1994 | Buchholz et al. |
| 5,309,440 A | 5/1994 | Nakamura et al. ....... 370/105.1 |
| 5,313,454 A | 5/1994 | Bustini et al. ................ 370/13 |
| 5,313,457 A | 5/1994 | Hostetter et al. ............. 370/18 |
| 5,315,591 A | 5/1994 | Brent et al. ................ 370/85.6 |
| 5,319,705 A | 6/1994 | Halter et al. |
| 5,319,707 A | 6/1994 | Wasilewski et al. |
| 5,319,712 A | 6/1994 | Finkelstein et al. |
| 5,321,514 A | 6/1994 | Martinez .................... 348/723 |
| 5,325,421 A | 6/1994 | Hou et al. .................... 379/67 |

| | | | | | | |
|---|---|---|---|---|---|---|
| 5,327,421 A | 7/1994 | Hiller et al. ............... 370/60.1 | | 5,481,561 A | 1/1996 | Fang .......................... 375/205 |
| 5,331,631 A | 7/1994 | Teraslinna | | 5,481,609 A | 1/1996 | Cohen et al. |
| 5,335,276 A | 8/1994 | Thompson et al. | | 5,483,595 A | 1/1996 | Owen |
| 5,337,044 A | 8/1994 | Folger et al. | | 5,490,252 A | 2/1996 | Macera et al. ......... 395/200.01 |
| 5,343,465 A | 8/1994 | Khalil .......................... 370/17 | | 5,491,695 A | 2/1996 | Meagher et al. ............ 370/112 |
| 5,345,445 A | 9/1994 | Hiller et al. ............... 370/60.1 | | 5,495,607 A | 2/1996 | Pisello et al. ............... 395/600 |
| 5,345,446 A | 9/1994 | Hiller et al. ............... 370/60.1 | | 5,497,420 A | 3/1996 | Garneau et al. |
| 5,347,304 A | 9/1994 | Moura et al. ................. 348/12 | | 5,504,814 A | 4/1996 | Miyahara |
| 5,351,146 A | 9/1994 | Chan et al. ................. 359/118 | | 5,506,904 A | 4/1996 | Sheldrick et al. |
| 5,353,336 A | 10/1994 | Hou et al. ..................... 379/67 | | 5,517,502 A | 5/1996 | Bestler et al. |
| 5,355,362 A | 10/1994 | Gorshe et al. ............. 370/16.1 | | 5,519,699 A | 5/1996 | Ohsawa ....................... 370/60 |
| 5,359,367 A | 10/1994 | Stockill | | 5,526,404 A | 6/1996 | Wiedeman et al. |
| 5,361,259 A | 11/1994 | Hunt et al. | | 5,526,489 A | 6/1996 | Nilakantan et al. |
| 5,363,369 A | 11/1994 | Hemmady et al. | | 5,532,914 A | 7/1996 | Kageyama et al. |
| 5,365,265 A | 11/1994 | Shibata et al. | | 5,539,884 A | 7/1996 | Robrock et al. ....... 395/200.12 |
| 5,365,524 A | 11/1994 | Hiller et al. ............... 370/94.2 | | 5,564,076 A | 10/1996 | Auvray |
| 5,373,550 A | 12/1994 | Campbell et al. | | 5,565,910 A | 10/1996 | Rowse et al. ................. 348/15 |
| 5,381,408 A | 1/1995 | Brent et al. .................... 370/60 | | 5,566,173 A | 10/1996 | Steinbrecher ................ 370/79 |
| 5,387,941 A | 2/1995 | Montgomery et al. ...... 348/473 | | 5,566,229 A | 10/1996 | Hou et al. |
| 5,387,994 A | 2/1995 | McCormack et al. | | 5,568,554 A | 10/1996 | Eastlake , III |
| 5,390,169 A | 2/1995 | Bernstein | | 5,579,370 A | 11/1996 | Fukushima et al. |
| 5,390,175 A | 2/1995 | Hiller et al. ................... 370/60 | | 5,587,743 A | 12/1996 | Montgomery et al. ...... 348/473 |
| 5,392,277 A | 2/1995 | Bernstein | | 5,592,173 A | 1/1997 | Lau et al. |
| 5,392,402 A | 2/1995 | Robrock, II ................ 395/200 | | 5,594,782 A | 1/1997 | Zicker et al. |
| 5,394,469 A | 2/1995 | Nagel et al. | | 5,600,844 A | 2/1997 | Shaw et al. |
| 5,394,561 A | 2/1995 | Freeburg | | 5,628,011 A | 5/1997 | Ahamed et al. ............ 395/610 |
| 5,400,329 A | 3/1995 | Tokura et al. | | 5,652,795 A | 7/1997 | Dillon |
| 5,400,401 A | 3/1995 | Wasilewski et al. | | 5,689,553 A | 11/1997 | Ahuja et al. |
| 5,402,418 A | 3/1995 | Shibata et al. | | 5,699,384 A | 12/1997 | Dillon |
| 5,402,478 A | 3/1995 | Hluchyj et al. ............. 379/221 | | 5,727,065 A | 3/1998 | Dillon |
| 5,404,505 A | 4/1995 | Levinson | | 5,796,727 A | 8/1998 | Harrison et al. |
| 5,408,237 A | 4/1995 | Patterson et al. ........... 342/354 | | 5,852,721 A | 12/1998 | Dillon et al. |
| 5,408,464 A | 4/1995 | Jurkevich .................... 370/16 | | | | |
| 5,412,647 A | 5/1995 | Giroux et al. | | | | |
| 5,412,660 A | 5/1995 | Chen et al. | | | | |
| 5,416,770 A | 5/1995 | Stoner et al. .................. 370/60 | | | | |
| 5,420,857 A | 5/1995 | Jurkevich .................... 370/60 | | | | |
| 5,420,866 A | 5/1995 | Wasilewski | | | | |
| 5,422,882 A | 6/1995 | Hiller et al. ............... 370/60.1 | | | | |
| 5,423,002 A | 6/1995 | Hart .......................... 395/200 | | | | |
| 5,425,027 A | 6/1995 | Baran ....................... 370/69.1 | | | | |
| 5,425,029 A | 6/1995 | Hluchyj et al. ............ 370/94.1 | | | | |
| 5,426,635 A | 6/1995 | Mitra et al. ................... 370/60 | | | | |
| 5,426,636 A | 6/1995 | Hiller et al. ............... 370/60.1 | | | | |
| 5,426,640 A | 6/1995 | Hluchyj et al. ............ 370/94.1 | | | | |
| 5,426,773 A | 6/1995 | Chabanet et al. | | | | |
| 5,428,607 A | 6/1995 | Hiller et al. ............... 370/60.1 | | | | |
| 5,428,608 A | 6/1995 | Freeman et al. ........... 370/60.1 | | | | |
| 5,428,616 A | 6/1995 | Field et al. | | | | |
| 5,428,629 A | 6/1995 | Gutman et al. ............ 371/37.1 | | | | |
| 5,430,848 A | 7/1995 | Waggener | | | | |
| 5,434,850 A | 7/1995 | Fielding et al. ............... 370/50 | | | | |
| 5,434,856 A | 7/1995 | Huang ......................... 370/62 | | | | |
| 5,436,891 A | 7/1995 | Grossman et al. | | | | |
| 5,438,565 A | 8/1995 | Hemmady et al. ............ 370/60 | | | | |
| 5,446,726 A | 8/1995 | Rostoker et al. ............. 370/17 | | | | |
| 5,446,730 A | 8/1995 | Lee et al. ...................... 370/54 | | | | |
| 5,448,564 A | 9/1995 | Thor ......................... 370/94.1 | | | | |
| 5,450,394 A | 9/1995 | Gruber et al. ................. 370/17 | | | | |
| 5,450,395 A | 9/1995 | Hostetter et al. | | | | |
| 5,452,293 A | 9/1995 | Wilkinson et al. ............ 370/54 | | | | |
| 5,457,780 A | 10/1995 | Shaw et al. | | | | |
| 5,457,808 A | 10/1995 | Osawa et al. .................. 455/8 | | | | |
| 5,457,811 A | 10/1995 | Lemson ..................... 455/67.1 | | | | |
| 5,463,777 A | * 10/1995 | Bialkowski et al. ......... 395/600 | | | | |
| 5,465,213 A | 11/1995 | Ross | | | | |
| 5,469,468 A | 11/1995 | Schilling .................... 375/200 | | | | |
| 5,469,495 A | 11/1995 | Beveridge .................... 379/56 | | | | |
| 5,471,473 A | 11/1995 | Tejima ...................... 370/85.7 | | | | |
| 5,473,602 A | 12/1995 | McKenna et al. ............ 370/60 | | | | |
| 5,473,612 A | 12/1995 | Dehner et al. ........... 370/105.4 | | | | |

OTHER PUBLICATIONS

Nick Cooper, "Network Technology for Multimedia," IEE Colloq. (1992) No. 160: Interactive Mutimedia: A Review and Update, pp. 6/1 to 6/3, 1992.*

"Communication, Television & Broadcast Satellite Systems, Theory & Technology", Hans Dodel et al., $2^{nd}$, revised edition, ©1990 Hüthig Verlag GmbH, Heidelberg, Telecommunications, vol. 7.

"VSAT Systems Considerations for the ORION Satellite" by Steven B. Salamoff and Denis J. Curin, Ph.D., of Orion Satellite Corporation, Sep. 1992.

"Satellite Communications Systems" from *Understanding Communiation Systems*, 1984, pp. 243–270.

"Fiber Optic and Satellite Communications" from *Understanding Data Communications*, 1993, pp. 202–207.

"Multiplexing Techniques" from *Understanding Data Communications*, 1993, pp. 161–178.

"Frame Relay and Its Transportation Dilemma" by Asim K.Roy, pp. 393–400, Sep. 1991.

"Some Aspects of Traffic Management in Frame Relay Networks" by A. Platt and M.J. Morse, presented at the Institution of electrical Engineers, Eigth U k Teletraffic Symposium, Apr. 10–12, 1991, pp. 23/1 –23/6.

"9800 Frame Relay Commands Reference Manual", Teleglobe Communication Products, Jun. 1993.

"Model 710 communications Subsystem", Harris Corporation, Business communication Systems Division, Melbourne, Florida, Dec. 1986, Sections 1–6.

"SCPC: Satellite Links with Infinite Uses", Feb. 1993, Telecom Asia, pp. CLO2148–CLO2149.

"VSAT–Enhanced ISDN: Architectures and Implementation" by Abdul H. Rana, et al, *IEEE Journal on Selected Areas in Communications*, Aug. 10, 1992.

"Model 712 Communications Subsystem", Harris Corporation, Business Communication Systems Division, Melbourne, Florida, May 1987, Sections 1–4.

"Principles of Communications Satellites" by Gordon and Morgan, pp. 114–135, 1993.

"Communications —Fusing Command, Control and Intelligence", Conference Record, vol. 2 of 3, San Diego, California, Oct. 11–14, 1992.

"The Management Aspects of Frame Relay" by Nathan J. Muller, *International Journal of Network Management*, pp. 87–99, Jun. 1992.

"Fiber Optic and Satellite Communications", by George E. Friend, et al, *Understanding Data Communications*, pp. 145–166; Jun., 1988.

"What Users Can Expect From New Virtual Wideband Services" by Stephen Fleming, Oct., 1990, pp. 29–36.

Brochure entitled "The SDM–HDLC Voice Packetizer Transmits Voice Over A Packet Network", 2 pages, by Advanced Compression Technology, Inc., 685 East Cochran Street, Simi Valley, CA 93065–1939, Jan. 20, 1993.

"Bringing the Telephone to Mexico —Satellites work in a Rural Environment" by Andres Liana, Jr., Jan., 1992, pp. 52–54.

"Reasonable Connectivity Through Multimedia Networking System", Sep. 1992, pp. 30–32.

Brochure entitled "MS–1000/MS–2000 Multimedia Switches" by Multimedia Networking Systems, pp. CLO4715–CLO4722, Jan. 20, 1993.

"ISDN over Satellite Networks", by B.A. Pontano et al, COMSAT Laboratories, Clarksburg, MD 20871–9475, 1992, IEEE, pp. 0560–0564.

"Wellfleet Unveils Two Bridge–Router Aimed at Branch Networking"by Andrew Collier, Internetworking —Comm. Week Apr. 19, 1993, single sheet.

Specification including General TDM Overview, Skydata, Sections 1–4, Annex III, Apr. 28, 1992.

Presentation, Cemex, May 1992.

FAX, Regarding TDM/TDMA System, Cemex, Apr. 27, 1992.

Polycon VSAT Proposal, Skydata, Sections 1–5, Annexes III–IV, XX, Mar. 18, 1992.

* cited by examiner

Address Field Format

Bit mapping for DLCI

FIG. 5

Bit mapping for FCS

FIG. 6

FRAME RELAY PROTOCOL-BASED MULTIPLEX SWITCHING SCHEME FOR SATELLITE MESH NETWORK

This is a continuation of application Ser. No. 08/499,766, filed Jul. 7, 1995 now abandoned, which is a continuation of Ser. No. 08/079,250, filed Jun. 17, 1993, now U.S. Pat. No. 5,434,850.

FIELD OF THE INVENTION

The present invention relates in general to satellite communication systems, and is particularly directed to a frame relay protocol-based earth station interface for providing full mesh, bidirectional signalling capability between a plurality of (diverse bandwidth) end terminal devices, including multiple audio (voice) circuits, for any of the stations of the network.

BACKGROUND OF THE INVENTION

The increasing availability of reasonably priced satellite communication services, and a variety of narrow bandwidth (voice/data) and wide bandwidth (video) devices to meet the needs of a broad spectrum of communication system users, has led to communication system architectures that can be tailored in terms of connectivity structure and customer utilization. This diversity of equipment types and signal processing capability has led to the desire to have 'local' area networks (LANs), customarily limited to a terrestrial-based systems, typically limited to geographical area, be expanded to encompass a much larger scale of communication services, preferably those employing satellite link transmission equipment to connect terminal devices among well dispersed office sites.

Figure 1:
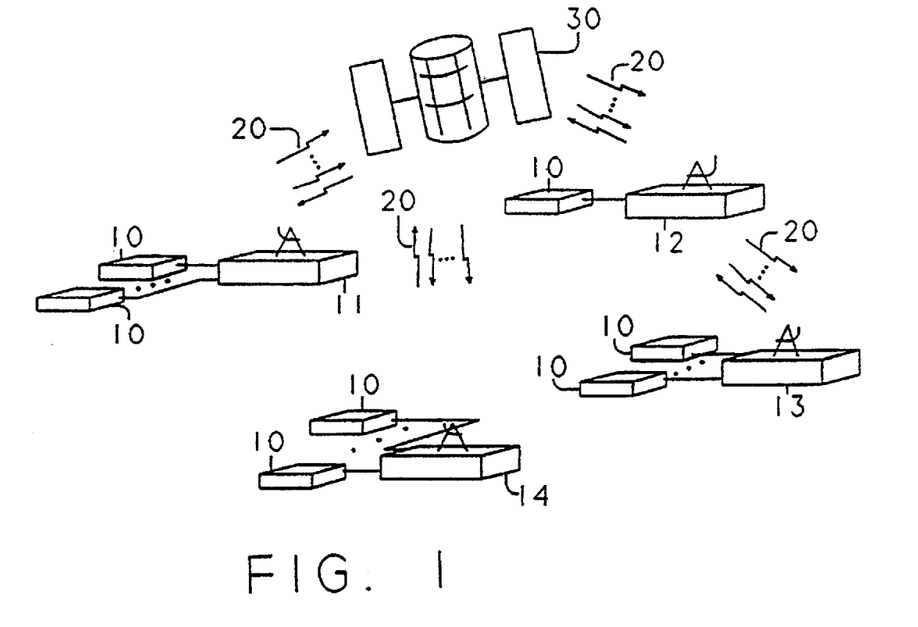
FIG. 1 diagrammatically illustrates a full mesh satellite-based communication network, where any terminal device in the network has a direct satellite link to any other terminal device in the network.

To facilitate inter-office communications, it is preferred to have such satellite-based systems configured as full mesh networks, diagrammatically illustrated in FIG. 1, where any terminal device 10 in the network (comprised of a non-limitative example of four earth stations 11, 12, 13, 14 in the illustrated example) has a direct satellite link 20 (via one hop through a relay satellite 30) to any other terminal device 10 in the network. Connectivity between a respective terminal device 10 that is ported to an associated station interface and a respective terminal device ported to another station interface may be effected by providing each earth station with a multiplexing, demultiplexing subsystem, that is operative to controllably uplink messages from any terminal device (e.g. audio (voice), data, video equipment) over an outbound link and to distribute downlink messages to their intended destination terminal devices.

One type of multiplexing scheme that might be used could involve a time division multiplexing (TDM) and demultiplexing arrangement through which a fixed number of bytes for each user port would be allocated within a fixed information frame. The frame size (total number of bytes) may be determined by the number of ports and their data rates, and the number of frames transmitted per second. The number of TDM frames per second determines the aggregate data rate. The aggregate data rate includes the total user port data rate plus framing overhead.

Interfacing respective terminal devices with the TDM subsystem may be effected by means of a dedicated multiport switch associated with the respective multiplexer and demultiplexer units of the earth station, with each multiport switch being configured for an equal number of data communications equipment (DCE) and data terminal equipment (DTE) ports, so as to provide full matrix capability between DCE and DTE ports. The port speed and format (DCE to DTE) must match; however, matrix switches can usually translate between different physical and electrical characteristics.

A problem associated with such a TDM-matrix switch earth station architecture proposal is the fact that its terminal-to-terminal connectivity involves dedicated port connections, which remain fixed unless the system is physically reconfigured. As a result, in such a system, only a very limited selectivity for voice calls is afforded, since only point-to-point connections can be effected between voice multiplexers and not among the voice circuits themselves that connect to the voice multiplexers. In addition, TDM schemes are very sensitive to timing and network synchronization, since no queuing is performed. A master network timing source is required for all network subsystems. Also, because suppliers of multiplexer and matrix switch components are not the same, different monitor and control mechanisms are required for each respective piece of equipment. This requirement is further burdened by the fact that, due to the unique character of a simplex data stream, the required multiplexer/demultiplexer is not an off-the-shelf product. Finally, the cost of such a system is not insubstantial, since each of the multiport switch and the multiplexer and demultiplexer components must be purchased separately.

SUMMARY OF THE INVENTION

In accordance with the present invention, the desire to provide full mesh connectivity for a relatively small number of network stations (e.g. on the order of sixteen or less, as a non-limitative example) is successfully addressed by a frame relay protocol-based earth station interface architecture. The fundamental component of this architecture is a frame relay protocol-based switch, or simply frame relay switch, which comprises a multiplex communication component recently introduced for use in voice/facsimile communication multiplex applications, and which employs a network interface 'frame relay' standard to define the multiplexing of multiple virtual ports across single physical communications port. The interface standard 'frame relay' is based upon the transmission and reception of individual frames or packets of information serially through a port, with a respective frame of digital data containing additional address and control bytes for routing and elementary error detection and flow control.

In the novel earth station environment of the present invention, the frame relay switch is ported, via a first set of terminal ports, to a plurality of 'local' terminal devices, which may include respective voice, data and video signalling equipments. A voice signal link transports low bit rate digitized voice signals, such as those having an encoding rate of less than 10 kb/s, to and from a voice signal multiplexer, in order to interface voice traffic with a plurality of voice signalling circuits that are selectively accessible through the multiplexer. The voice signalling link also conveys call supervision signals, including dial tone detection, dialing, circuit busy, call connect and call termination control and status signals. The voice signal multiplexer is operative to append and decode terminal device selectivity information to the address field portion of a frame processed by the frame relay switch.

Also ported to the frame relay switch are one or more data links that may be coupled to two-way synchronous data terminal devices, providing data rate signalling on the order of 256 Kb/s, for example. An additional port of the frame relay switch may be coupled to a link for wide bandwidth signals, such as a video teleconferencing terminal. The teleconferencing video and its associated voice signals may be digitized and compressed into a single data stream at aggregate data rates on the order of from 112 to 384 kb/s, for example. Because of the wider bandwidth required for video teleconferencing capability, the video communication port of the frame relay switch is intended to be used on only an occasional basis, and may require one or more other signalling channels to be turned off during the teleconferencing period.

Through address and control fields employed by frame relay connectivity control software, the frame relay switch can be dynamically configured to provide multilayer addressing and device selectivity (filtering), thereby enabling point-to-point connectivity of multiple terminal devices, such as a plurality of voice circuits served by the voice circuit multiplexer unit to which a voice signal port of the frame relay switch is coupled. Dial codes on the trunk or station side of the voice signal link are translated into frame relay addresses (data link connection identifiers) that are added to each frame of data for routing through the network. With this additional layer of routing information, voice connectivity is now available between any two voice terminal devices (e.g. trunks) in the network.

On its satellite link side, the frame relay switch is ported to a plurality of modulator and demodulator circuits contained within a modulator/demodulator unit. To provide full mesh connectivity among the multiple earth station network, the circuits of the modulator/demodulator unit include a single uplink modulator and a plurality of downlink demodulators. The respective modulator and demodulator components may comprise PSK signalling units employing, for example, (data rate dependent) BPSK/QPSK/MSK modulation. The modem unit is coupled to an attendant RF transceiver unit that is coupled to an associated satellite antenna unit for transmitting uplink channel signals to the relay satellite and receiving downlink channel signals from the satellite.

In order to optimize traffic flow among the diversity of terminal devices (voice, data, video) served by the frame relay-based interface of the present invention, the routing control mechanism employed by the frame switch relay's microcontroller includes priority queuing, which provides a plurality of queuing levels to control queuing delay through the frame relay switch. Voice frames are given highest priority, video teleconferencing frames are given the next highest priority, and data frames are given lowest priority. The queuing mechanism is defined such that during normal operation, the frame relay switch will not have more offered traffic than the aggregate outbound channel can handle. Priority queuing has effectively no impact on the sequence of transmitted frames. Where the offered load increases or the channel error rate exceeds prescribed limits, the priority queuing mechanism is operative to reduce the load impact on video teleconferencing first and then voice signalling traffic.

Since, in a full connectivity mesh network, each earth station is continuously monitoring each downlink channel for message frames that may be addressed to it, it is desirable to provide a mechanism for reducing signal processing housekeeping that would otherwise be executed on data frames that are not intended for a destination terminal device served by that earth station. The port configuration parameters of the frame relay switch define a bit mask, which is employed by the microcontroller to 'filter' and selectively discard or pass frames based upon a portion of or the entirety of the first byte of the frame relay address. This mask feature allows only downlinked frames from multiple inbound channels that are destined for one or more terminal devices served by that earth station to be accepted and processed by the frame relay switch. This preliminary filtering reduces processing load and increases efficiency of the routing through the frame relay switch.

The address and routing mechanism employed by the frame relay switch's microcontroller also inserts, within the frame relay header, a discard eligibility bit, which signifies to the frame relay network whether or not, during periods of congestion, that frame can be initially discarded in an attempt to alleviate the congestion condition. As a result of potential system congestion related to the above described priority queuing and filtering mechanisms, a prespecified data link connection identifier may be employed to 'force' the discard eligibility bit in the frame relay header to a 'one' bit for all frames utilizing that particular data link connection identifier. This forcing of the discard eligibility bit to a 'one' by means of a data link connection identifier provides an extra level of control on frames originating from terminal devices that may be unable to set the discard eligibility bit themselves.

DETAILED DESCRIPTION

Before describing in detail the particular frame relay protocol-based earth station interface in accordance with the present invention, it should be observed that the present invention resides primarily in a novel structural combination of conventional (commercially available) signal processing circuits and components and not in the particular detailed configurations thereof. Accordingly, the structure, control and arrangement of these circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
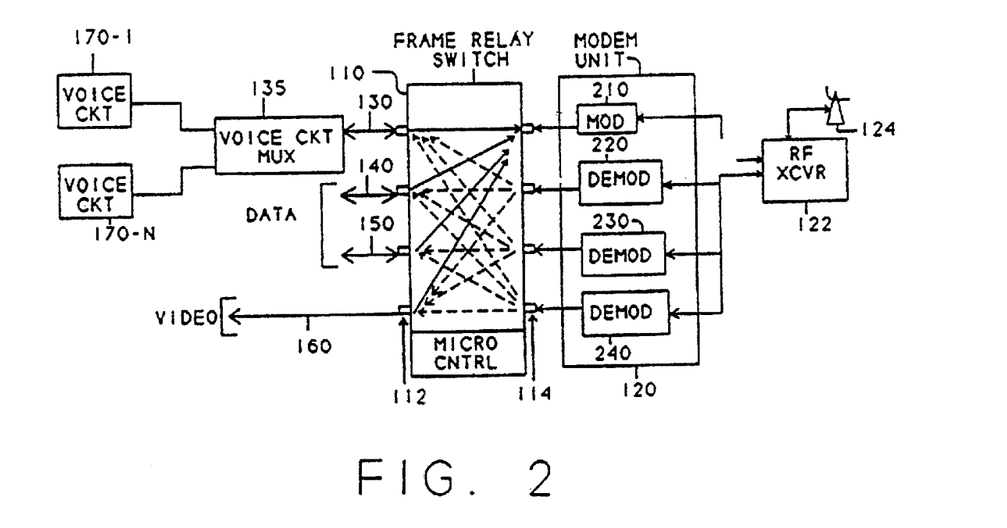
FIG. 2 diagrammatically illustrates the architecture of a frame relay protocol-based earth station interface in accordance with an embodiment of the present invention.

Referring now to FIG. 2, the architecture of a frame relay protocol-based earth station interface in accordance with an embodiment of the present invention is diagrammatically illustrated as comprising a frame relay protocol-based switch (or simply frame relay switch) 110, having a plurality of bidirectional signal coupling ports and serving to controllably interface signal transport links, that are coupled to a plurality of terminal devices, with modulator and demodulator components associated with a satellite communication RF transceiver unit.

More particularly, frame relay switch 110 has a first plurality of physical device, or terminal, ports 112, that are coupled to a plurality of 'local' terminal devices via respective terminal device links, such as a voice signal multiplexer link 130, a plurality of data links 140, 150 and a video link 160. Voice signal link 130 transports low bit rate digitized voice signals, such as those having an encoding rate of less than 10 kb/s, with echo cancellation and minimal queuing delay to and from a voice signal multiplexer 135. Voice signal multiplexer 135, in turn, is coupled to a plurality of voice signalling circuits. The ports of multiplexer 135 which provide connectivity between one of plural voice signalling circuits and voice signal link 130 are, in effect, virtual ports of the frame relay switch 110, since link 130 is physically connected to a single port of multiplexer 135 and not to the terminal devices themselves.

For incoming signals from a respective voice circuit, multiplexer 135 is operative to selectively couple signals sourced from that voice circuit terminal device (e.g. trunk circuit) to voice signal link 130. In the course of multiplexing such a selected voice circuit to voice signal link 130, multiplexer 135 provides data link connection identifier information (the virtual port address) as part of the address field of the call message signals being supplied to the frame relay switch. The destination address field also contains a terminal device (e.g. called party number) code that a voice circuit multiplexer served by a destination station employs to control the demultiplexing of the voice signals to the called terminal device.

Similarly, in the course of demultiplexing an incoming call supplied from frame relay switch 110 via voice signal link 130, multiplexer 135 decodes the data link connection identifier information as part of the address field of the call message signals being supplied from the frame relay switch, so as to controllably direct the call to the intended terminal device. Also carried via link 130 are conventional call supervision signals, including dial tone detection, dialing, circuit busy, call connect and call termination control and status signals.

Data links 140 and 150 may be coupled to two-way synchronous data terminal devices, and may provide data rate signalling on the order of 256 Kb/s. Video link 160 may be coupled to a video teleconferencing terminal. The teleconferencing video and its associated voice signals may be digitized and compressed into a single data stream at aggregate data rates on the order of from 112 to 384 kb/s, for example. Because of the wider bandwidth required for video teleconferencing capability, the video communication port of the frame relay switch is intended to be used on only an occasional basis, and may require one or more other signalling channels to be turned off during the teleconferencing period.

Frame relay switch 110 may comprise a commercially available frame relay switch unit, such as a model 9800, microcontroller-driven, frame relay switch, manufactured by Teleglobe Inc., Montreal, Canada. The frame relay switch employs the network interface 'frame relay' standard (e.g. ANSI, pending CCITT), to define the multiplexing of multiple virtual ports across single physical communications port. The interface standard 'frame relay' is based upon the transmission and reception of individual frames (or packets) of information serially through a port. In accordance with this standard, a respective frame of digital data contains address and control bytes that are employed for routing and elementary error detection and flow control.

Figure 3:
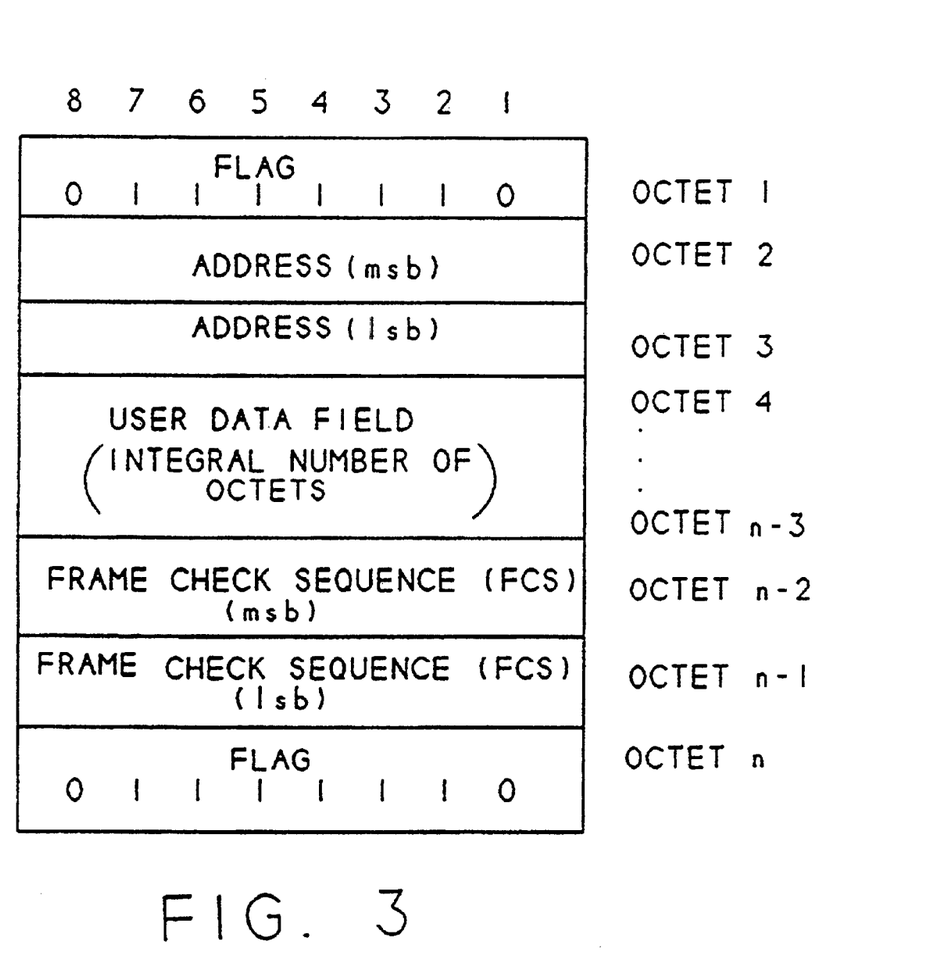
FIG. 3 illustrates the field format of a frame relay frame.

FIG. 3 illustrates the field format of a frame relay frame, as comprising an n octet frame including a first frame boundary flag (octet 1=01111110), a sixteen bit address field comprised of address octets 2 and 3, a user data field comprised of octets 3–n–3, a sixteen bit frame check sequence (FCS) occupying octets n–2 and n–1, and a terminal frame boundary flag (octet n=01111110).

Figure 4:
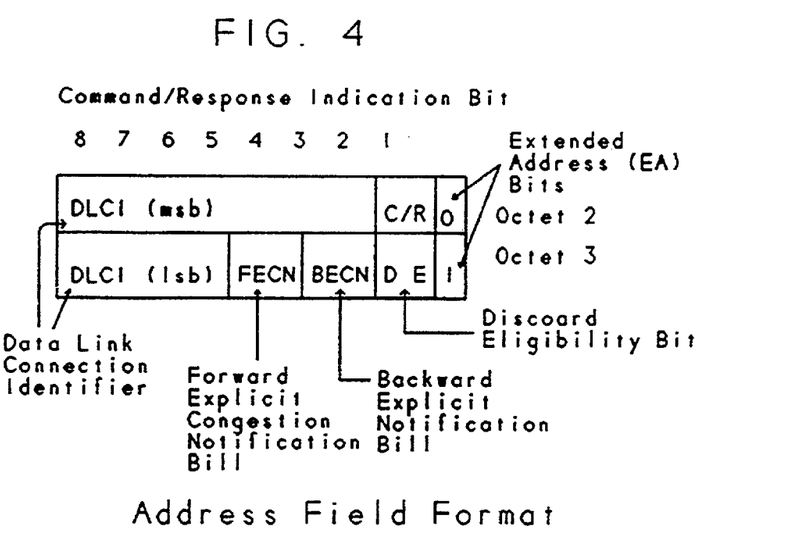
FIGS. 4, 5 and 6 show details of respective address, data link connection identifier (DLCI) and frame check sequence (FCS) fields of the frame relay format of FIG. 3.
Figure 5:
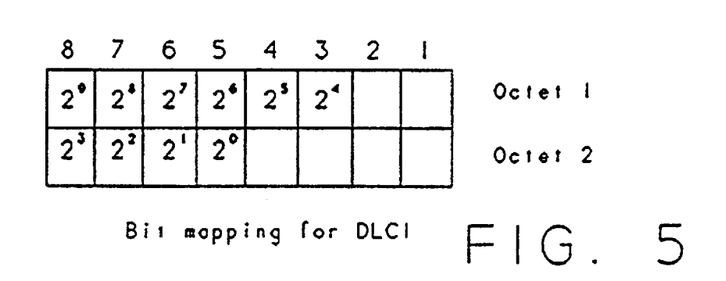
Figure 6:
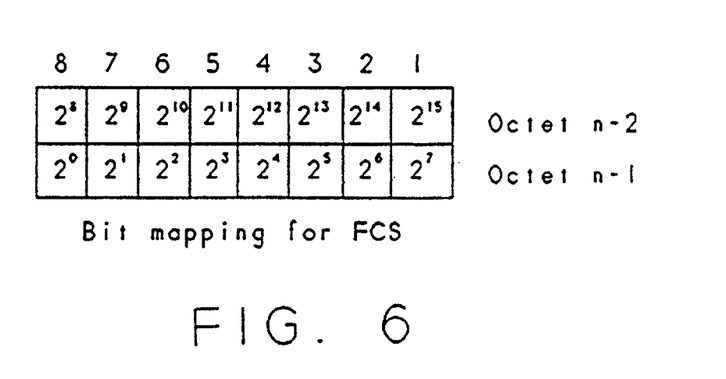

The respective components of the address field of the frame relay frame format of FIG. 3, of which octets 2 and 3 are comprised, are diagrammatically illustrated in FIG. 4 as comprising a first data link connection identifier (DLCI) comprised of bits 3–8 of octet 2, a (currently unused) bit 2, an extended address bit 1, a second data link connection identifier (DLCI) comprised of bits 5–8 of octet 3, a forward (towards the destination device) explicit congestion notification bit 4, a backward (from the sourcing device) explicit congestion notification bit 3, a discard eligibility bit 2 (to be described) and an extended address bit 1. The bit mapping for each data link connection identifier (DLCI) is shown in FIG. 5, while FIG. 6 shows the bit mapping for the frame check sequence.

As noted above, through the address and control fields of its connectivity control software, frame relay switch 110 can be dynamically configured to provide multilayer addressing and device selectivity (filtering), thereby enabling point-to-point connectivity of multiple terminal devices, such as a plurality of voice circuits 170-1, . . . 170-N served by voice circuit multiplexer unit 135, to which voice signal multiplexer link 130 is coupled, to be effected via a single port. For this purpose, dial codes on the analog trunk or station side of voice signal multiplexer link 130, which codes effectively represent virtual ports of the frame relay switch, are translated into frame relay addresses (or data link connection identifiers) that are added to each frame of data for routing through the network. With this additional layer of routing information, voice connectivity is now available between any two terminal devices (e.g. trunk circuits) in the network.

On its satellite link side, frame relay switch 110 is ported, via a second set 114 of terminal ports, to a plurality of modulator and demodulator circuits contained within a modulator/demodulator unit 120. To provide full mesh connectivity among the (four earth station) network of the non-limitative example of FIG. 1, described above, modulator/demodulator (MODEM) unit 120 includes a single uplink modulator 210, and a plurality (three for the present example of a four earth station network) of downlink demodulators 220, 230 and 240. The respective modulator and demodulator components within MODEM unit 120 may comprise PSK signalling units employing, for example, (data rate dependent) BPSK/QPSK/MSK modulation. Thus, frame relay switch 110 provides for dynamic routing of signals between one or more terminal devices to which ports 112 are coupled, and one or more modulators and demodulators of MODEM unit 120 to which ports 114 are coupled.

MODEM unit 120 is coupled to an attendant RF transceiver unit 122 that is coupled with a satellite uplink/downlink antenna unit 124. As a non-limitative example, the respective components of modem unit 120 may interface signals with RF transceiver unit 122 at a frequency on the order of 70MHz, while the satellite communication signals emitted by and received by RF transceiver unit 122 may fall within bandwidth of 11–14.5 GHz. RF transceiver unit 122 may operate with time division multiple access (TDMA) or single channel per carrier (SCPC) signalling formats.

In order to optimize traffic flow among terminal devices (voice, data, video equipments) served by the frame relay-based interface of the present invention, the routing lo control mechanism employed by the frame switch relay's microcontroller also includes priority queuing, which provides a plurality (e.g. three for the three types of terminal device signalling services of the present example (voice, data, video)) of queuing levels to control queuing delay through the frame relay switch 110. In particular, voice frames (ported via link 140) are given highest priority, video teleconferencing frames (ported via link 160) are given the next highest priority, and data frames (ported via links 150) are given lowest priority. The queuing mechanism is defined such that during normal operation, the frame relay switch 110 will not have more offered traffic than the aggregate outbound channel can handle. Priority queuing has effectively no impact on the sequence of transmitted frames. Where the offered load increases or the channel error rate exceeds prescribed limits, the priority queuing mechanism is operative to reduce the load impact on video teleconferencing first and then voice signalling traffic.

Since, in a full connectivity mesh network, each earth station is continuously monitoring each downlink channel for message frames that may be addressed to it, it is desirable to provide a mechanism for reducing signal processing housekeeping that would otherwise be executed on data frames that are not intended for a destination terminal device served by that earth station. For this purpose, the port configuration parameters of the frame relay switch may be employed to define a bit mask, which is employed by the microcontroller to 'filter' and selectively discard or pass frames based upon a portion of or the entirety of the first byte of the frame relay address. This mask feature allows only downlinked frames from multiple inbound channels that are destined for one or more terminal devices served by that earth station to be accepted and processed by the frame relay switch. This preliminary filtering reduces processing load and increases efficiency of the routing through the frame relay switch.

The address and routing mechanism employed by the frame relay switch's microcontroller contains, within the frame relay header, the above-referenced discard eligibility (DE) bit (within the second octet of the address field, shown in FIG. 4), which signifies to the frame relay network whether or not, during periods of congestion, that frame can be initially discarded in an attempt to alleviate the congestion condition. Namely, any frame whose discard eligibility bit has been set to a 'one' will be discarded in an attempt to alleviate the congestion condition. As a result of potential system congestion related to the above described priority queuing and filtering mechanisms, a prespecified data link connection identifier may be employed to 'force' the discard eligibility bit in the frame relay header to a 'one' bit for all frames utilizing that particular data link connection identifier. This forcing of the discard eligibility bit to a 'one' by means of a data link connection identifier provides an extra level of control on frames originating from terminal devices that may be unable to set the discard eligibility bit themselves.

As will be appreciated from the foregoing description, the frame relay-based earth station interface architecture in accordance with the present invention provides a mechanism for successfully achieving full mesh connectivity for a relatively small number of network stations. Advantageously, since the fundamental component of the architecture is a frame relay switch, which employs a network interface 'frame relay' standard to define the multiplexing of multiple virtual ports across single physical communications port. As a consequence, through address and control fields of its connectivity control software, the frame relay switch can be dynamically configured to provide multilayer addressing and device selectivity, thereby enabling point-to-point connectivity of multiple terminal devices, such as a plurality of voice circuits, to be effected via a single port. Dial codes on the station side of an audio (voice) signal multiplexer link are translated into frame relay addresses (data link connection identifiers) that are added to each frame of data for routing through the network. With this additional layer of routing information, audio (voice) connectivity is now available between any two audio (voice) circuits (e.g. trunks) in the network.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use in a satellite communication network providing full mesh connectivity through a communication satellite, among terminal devices that are coupled to associated earth stations of a multi-earth station network that is comprised of at least three earth stations, a respective earth station apparatus comprising:

a transceiver unit which is operative to transmit, via an up-link communication channel associated with said respective earth station to said communication satellite, messages which are broadcast by said communication satellite over plural downlink communication channels to plural others of said at least three earth stations of said network, and which is operative to receive, via plural downlink communication channels from said communication satellite, messages which have been transmitted uplink to said satellite over a plurality of other up-link channels respectively associated with plural others of said at least three earth stations, and which are broadcast by said communication satellite over said plural downlink communication channels to the earth stations of said network;

a modulator/demodulator unit, which is coupled with said transceiver unit and is operative to modulate uplink-directed messages, supplied by one or more terminal devices that are coupled to said earth station, in accordance with a prescribed modulation format for transmission by said transceiver unit over said uplink channel, and to demodulate downlink-directed messages which have been broadcast by said communication satellite over said plural downlink communication channels to the earth stations of said network, and which are received by said transceiver unit from said communication satellite and destined for one or more terminal devices that are coupled to said earth station; and a frame relay protocol-based switch, having a plurality of communication link-associated ports coupled to communication links for receiving therefrom messages whose contents are representative of frame relay protocol-based routing information supplied from terminal devices served by said respective earth station, and for delivering, to terminal devices served by said respective earth station, downlink-directed messages which have been broadcast by said communication satellite over said plural downlink communication channels to the earth stations of said network, and received by said transceiver unit from said communication satellite and destined for one or more terminal devices that are coupled to said respective earth station, and a plurality of uplink/downlink ports, coupled to said modulator/demodulator unit, said frame relay protocol-based switch being operative to controllably connect a selected one of said communication link-associated ports to a selected one of said uplink/downlink ports, and thereby connect uplink-directed message signals from any terminal device to an uplink port of said plurality of uplink/downlink ports, for modulation by said modulator/demodulator unit connected thereto in accordance with said prescribed modulation format for transmission by said transceiver unit over said uplink channel, and to controllably route downlink-directed message signals, that have been broadcast by said communication satellite over said plural downlink communication channels and received by said transceiver unit, demodulated by said modulator/demodulator unit and coupled to downlink ports of said plurality of uplink/downlink ports, to any selected one of said communication link-associated ports, in accordance with routing information contained in said downlink-directed messages of said plural downlink communication channels from other earth stations of said network.

2. An earth station apparatus for use in a satellite communication network according to claim 1, wherein said communication channels comprise time division multiple access communication channels.

3. An earth station apparatus for use in a satellite communication network according to claim 1, wherein said communication channels comprise single channel per carrier communication channels.

4. An earth station apparatus for use in a satellite communication network according to claim 1, one of said plurality of communication link-associated ports is coupled to a terminal device multiplexer which is operative to controllably interface signals between a plurality of virtual ports to which plural terminal devices served by said respective earth station are coupled and said one of said plurality of communication link-associated ports.

5. An earth station apparatus for use in a satellite communication network according to claim 1, wherein one of said plurality of communication link-associated ports is coupled to an audio signalling circuit multiplexer which is operative to controllably interface audio message signals between a plurality of virtual ports to which audio circuit devices served by said respective earth station are coupled and said one of said plurality of communication link-associated ports.

6. An earth station apparatus for use in a satellite communication network according to claim 3, wherein said modulator/demodulator unit contains a plurality of downlink demodulators which are operative to demodulate downlink-directed messages that have been broadcast by said communication satellite over plural downlink communication channels at a plurality of respectively different frequencies, and only a single uplink modulator which is operative to modulate uplink-directed messages, supplied by one or more terminal devices coupled to said respective earth station, in accordance with said prescribed modulation format for transmission by said transceiver unit over an uplink channel frequency different from said plurality of respectively different frequencies.

7. An earth station apparatus for use in a satellite communication network according to claim 1, wherein said terminal devices include respective audio, data and video signalling devices.

8. An earth station apparatus for use in a satellite communication network according to claim 1, wherein said frame relay protocol-based switch is operative to route message signals therethrough in accordance with a plurality of queuing levels respectively associated with different types of messages signals.

9. An earth station apparatus for use in a satellite communication network according to claim 8, wherein said terminal devices include respective audio, data and video signalling devices and wherein said frame relay protocol-based switch is operative to route message signals therethrough such that audio frames are given highest priority, video teleconferencing frames are given the next highest priority, and data frames are given lowest priority.

10. An earth station apparatus for use in a satellite communication network according to claim 8, wherein port configuration parameters of said frame relay protocol-based switch define a frame routing control code which is operative to selectively discard or pass frames based upon a prescribed portion of a frame relay address.

11. An earth station apparatus for use in a satellite communication network according to claim 10, wherein said port configuration parameters of said frame relay protocol-based switch which define said frame routing control code are based upon contents of a first byte of the frame relay address.

12. An earth station apparatus for use in a satellite communication network according to claim 8, wherein a frame associated with a prescribed frame address processed by said frame relay-based protocol switch contains a frame relay header that includes a discard eligibility code which causes said respective frame to be initially discarded in an attempt to alleviate a congestion condition.

13. For use in a satellite communication network providing full mesh connectivity through a communication satellite, among terminal devices that are coupled to associated earth stations of a multi-earth station network that is comprised of at least three earth stations, a method of providing full mesh connectivity between any two terminal devices of said network comprising the steps of:

(a) providing, at a respective earth station,
a transceiver unit which is operative to transmit, via an up-link communication channel associated with said respective earth station to said communication satellite, messages which are broadcast by said communication satellite over plural downlink communication channels to plural others of said at least three earth stations of said network, and which is operative to receive, via plural downlink communication channels from said communication satellite, messages which have been transmitted up-link to said satellite over a plurality of other up-link channels respectively associated with plural others of said at least three earth stations, and which are broadcast by said communication satellite over said plural downlink communication channels to the earth stations of said network, a modulator/demodulator unit, which is coupled with said transceiver unit and is operative to modulate uplink-directed messages, supplied by one or more terminal devices that are coupled to said earth station, in accordance with a prescribed modulation format for transmission by said transceiver unit over said uplink channel, and to demodulate downlink-directed messages which have been broadcast by said communication satellite over said plural downlink communication channels to the earth stations of said network, and which are received by said transceiver unit from said communication satellite and destined for one or more terminal devices that are coupled to said earth station, and a frame relay protocol-based switch, having a plurality of communication link-associated ports coupled to communication links for receiving therefrom messages whose contents are representative of frame relay protocol-based routing information supplied from terminal devices served by said respective earth station, and for delivering, to terminal devices served by said respective earth station, downlink-directed messages which have been broadcast by said communication satellite over said plural downlink communication channels to the earth stations of said network, and received by said transceiver unit from said communication satellite and destined for one or more terminal devices that are coupled to said respective earth station, and a plurality of uplink/downlink ports, coupled to said modulator/demodulator unit, said frame relay protocol-based switch being operative to controllably connect a selected one of said communication link-associated ports to a selected one of said uplink/downlink ports, and thereby connect uplink-directed message signals from any terminal device to an uplink port of said plurality of uplink/downlink ports, for modulation by said modulator/demodulator unit connected thereto in accordance with said prescribed modulation format for transmission by said transceiver unit over said uplink channel, and to controllably route downlink-directed message signals, that have been broadcast by said communication satellite over said plural downlink communication channels and received by said transceiver unit, demodulated by said modulator/demodulator unit and coupled to downlink ports of said plurality of uplink/downlink ports, to any selected one of said communication link-associated ports, in dependence upon routing information contained in said downlink-directed messages of said plural downlink communication channels from other earth stations of said network, (b) at a first earth station, coupling a message that has been sourced from a calling terminal device and contains frame relay protocol-based routing information, over a communication link to a communication link-associated port of the frame relay protocol-based switch of said first earth station, and causing the frame relay protocol-based switch of said first earth station to connect said communication link-associated port to an uplink port of said uplink/downlink communications ports, and thereby connect uplink-directed message signals from said calling terminal device to said uplink port of said plurality of uplink/downlink ports for transmission via said up-link communication channel associated with said first earth station to said communication satellite; and (c) at a second earth station, terminating messages to destination terminal devices by causing the frame relay protocol-based switch of said second earth station to controllably route downlink-directed message signals of said plural downlink communication channels associated with said other earth stations of said network, and which are coupled to downlink ports of said plurality of uplink/downlink ports, to selected communication link-associated ports of said frame relay protocol-based switch, to which communication links serving said destination terminal devices are coupled, in accordance with routing information contained in downlink-directed messages received over any of said plural downlink communication channels.

14. A method according to claim 13, wherein said communication channels comprise time division multiple access communication channels.

15. A method according to claim 13, wherein said communication channels comprise single channel per carrier communication channels.

16. A method according to claim 13, one of said plurality of communication link-associated ports is coupled to a terminal device multiplexer which is operative to controllably interface signals between a plurality of virtual ports to which plural terminal devices served by said respective earth station are coupled and said one of said plurality of communication link-associated ports.

17. A method according to claim 13, wherein one of said plurality of communication link-associated ports is coupled to an audio signalling circuit multiplexer which is operative to controllably interface audio message signals between a plurality of virtual ports to which audio circuit devices served by said respective earth station are coupled and said one of said plurality of communication link-associated ports.

18. A method according to claim 15, wherein said modulator/demodulator unit contains a plurality of downlink demodulators which are operative to demodulate downlink-directed messages that have been broadcast by said communication satellite over plural downlink communication channels at a plurality of respectively different frequencies, and only a single uplink modulator which is operative to modulate uplink-directed messages, supplied by one or more terminal devices coupled to said respective earth station, in accordance with said prescribed modulation format for transmission by said transceiver unit over an uplink channel frequency different from said plurality of respectively different frequencies.

19. A method according to claim 13, wherein said terminal devices include respective audio, data and video signalling devices.

20. A method according to claim 13, wherein said frame relay protocol-based switch is operative to route message signals therethrough in accordance with a plurality of queuing levels respectively associated with different types of messages signals.

21. A method according to claim 20, wherein said terminal devices include respective audio, data and video signalling devices and wherein said frame relay protocol-based switch is operative to route message signals therethrough such that audio frames are given highest priority, video teleconferencing frames are given the next highest priority, and data frames are given lowest priority.

22. A method according to claim 20, wherein port configuration parameters of said frame relay protocol-based switch define a frame routing control code which is operative to selectively discard or pass frames based upon a prescribed portion of a frame relay address.

23. A method according to claim 22, wherein said port configuration parameters of said frame relay protocol-based switch which define said frame routing control code are based upon contents of a first byte of the frame relay address.

24. A method according to claim 20, wherein a frame associated with a prescribed frame address processed by said frame relay-based protocol switch contains a frame relay header that includes a discard eligibility code which causes said respective frame to be initially discarded in an attempt to alleviate a congestion condition.

25. A system comprising:
a satellite; and
first, second, and third earth stations interconnected via a single hop through the satellite, wherein the first earth station for sending data packets to the second and third earth stations, the second earth station for sending data packets to the first and third earth stations, and the third earth station for sending data packets to the first and second earth stations, each earth station including:
a satellite antenna for communicating with the satellite,
a transceiver coupled to the antenna for sending and receiving signals to and from the satellite antenna,
a modem coupled to the transceiver for modulating and demodulating signals sent to or received from the transceiver,
a plurality of terminal devices including at least two voice circuits each generating a dial code,
a switch, coupling a plurality of terminal devices with the modem, and for inputting data from the plurality of terminal devices, assembling the data into frame relay based data packets having a frame boundary flag, an address field responsive to one of the dial codes, a data field, and a frame check sequence, for discarding down link directed data packets destined for terminal devices associated with other switches and for routing down link directed data packets destined for terminal devices associated with the switch based on the contents of the down-link directed data packets.

26. The system of claim 25 wherein each switch is a frame-relay protocol based switch.

27. The system of claim 26 wherein the data packets are arranged according to a frame relay standard.

28. The system of claim 27 wherein the data packets are configured according to CCITT frame relay standards.

29. The system of claim 25 wherein each earth station includes a plurality of terminal devices including at least two voice circuits each generating a dial code.

30. The system of claim 29 including a voice multiplexer unit disposed between the two voice circuits and the switch.

31. The system of claim 30 wherein the output of the voice multiplexer unit is packetized data.

32. The system of claim 31 wherein the voice multiplexer unit outputs data packets assembled based on frame relay standards.

33. The system of claim 25 wherein the switch includes connectivity control software for dynamically configuring the switch to provide multilayer addressing and filtering.

34. The system of claim 25 wherein the modem includes a single modulator and a plurality of demodulators.

35. The system of claim 25 wherein the transceiver uses a time division multiple access protocol.

36. The system of claim 25 wherein the switch is configured to assemble data packets from data received on one or more data circuits and wherein the data packets assembled from the voice circuits have priority over data packets assembled from the data circuits.

37. A first earth station for use in a system having at least three earth stations interconnected via a single hop through a satellite wherein data from each earth station is broadcast to every other earth station, the first earth station comprising:
a satellite antenna,
a transceiver coupled to the satellite antenna for sending signals to and receiving signals from the satellite antenna,
a modem coupled to the transceiver for modulating and demodulating signals sent to or received from the transceiver, and
a switch capable of supporting frame relay protocols, coupling a plurality of terminal devices to the modem, and for inputting data from the plurality of terminal devices, packetizing the data into data packets having a boundary flag, an address field a data field, and a frame check sequence, and for discarding received data packets which are not directed to the first earth station and for routing data packets which are directed to the first earth station based upon the contents of down-link directed data packets.

38. The system of claim 37 wherein the switch is a frame-relay protocol based switch.

39. The system of claim 37 wherein the data packets are arranged according to a frame relay based standard.

40. The system of claim 39 wherein the data packets are configured according to CCITT frame relay standards.

41. The system of claim 37 wherein the first earth station includes at least two voice circuits, each generating a dial code.

42. The system of claim 41 including a voice multiplexer unit disposed between the two voice circuits and the switch.

43. The system of claim 42 wherein the voice multiplexer unit is configured to output packetized data.

44. The system of claim 43 wherein the voice multiplexer unit is configured for decoding the address field and for coupling data in an associated data field to a particular voice circuit dependent upon the address field in the data packet.

45. The system of claim 44 wherein the switch includes connectivity control software allowing the switch to be dynamically configured to provide multilayer addressing and filtering.

46. The system of claim 37 wherein the modem includes a single modulator and a plurality of demodulators.

47. The system of claim 46 wherein the transceiver is configured to uses a single carrier per channel protocol.

48. The system of claim 37 wherein the transceiver is configured to use a time division multiple access protocol.

49. The system of claim 37 wherein the switch is configured to provide data packets containing data from the voice circuits with priority over at least some packets which do not contain data from the voice circuits.

50. For use in a system having a satellite and at least three earth stations, the method comprising relaying frame relay voice packets having an address code responsive to a dial code and frame relay data packets from the first earth station directly to the second and third earth stations and from the second earth station directly to the first and third earth station and from the third earth station directly to the first and second earth station in a single hop, wherein connectivity is achieved between terminal devices coupled to the first, second, and third earth stations, and wherein the contents of the frame relay packets are utilized to determine the routing and filtering at each earth station.

51. A system comprising first, second, and third earth stations interconnected via a satellite with each earth station for broadcasting frame relay protocol based data packets to the other earth stations, wherein each earth station includes a switch for inputting data from a plurality of terminal devices, for packetizing the data into the frame relay protocol based data packets having an address field, and for filtering and routing data packets received from the satellite based on the contents of an address field of down-link directed data packets.

52. The system of claim 51 wherein the frame relay protocol based data packets are configured according to CCITT frame relay standards.

53. The system of claim 51 wherein each earth station includes a voice multiplexer unit disposed between at least some of the terminal devices and the switch.

54. The system of claim 53 wherein the output of the voice multiplexer unit includes frame relay protocol based data packets.

55. The system of claim 51 wherein the switch includes connectivity control software for dynamically configuring the switch to provide multilayer addressing and filtering.

56. The system of claim 51 wherein the earth stations are configured for using a single carrier per channel protocol.

57. The system of claim 51 wherein the earth stations are configured for using a time division multiple access protocol.

58. The system of claim 51 wherein data packets containing data from voice links have priority over data packets containing data from data links.

59. A first earth station for use in a system having at least two other earth stations interconnected via a satellite wherein data from each earth station is broadcast to the other earth stations, the first earth station comprising a data link, at least two voice circuits each having a dial code, and a switch configured for inputting data from the voice circuits and packetizing the data into data packets having an address field responsive to one of the dial codes, packetizing data from data circuits into data packets, and filtering and routing down-link directed data packets based on the content of the data packets, wherein the switch packetizes the data packets using elementary error detection and is configurable to support frame relay based protocols.

60. The system of claim 59 wherein the switch is a frame-relay protocol based switch.

61. The system of claim 60 wherein the data packets are based on a frame relay standard.

62. The system of claim 61 wherein the data packets are configured according to CCITT frame relay standards.

63. The system of claim 59 including a voice multiplexer unit disposed between the two voice circuits and the switch.

64. The system of claim 63 wherein the voice multiplexer unit is configured for outputting packetized data.

65. The system of claim 64 wherein the voice multiplexer unit decodes the address field and couples data in an associated data field to a particular voice circuit dependent upon the address field in the data packet to thereby form virtual ports in the switch.

66. The system of claim 65 wherein the switch includes connectivity control software for dynamically configuring the switch to provide multilayer addressing and filtering.

67. The system of claim 59 wherein the earth stations are configured to communicate using a single carrier per channel.

68. The system of claim 59 wherein the earth stations are configured to communicate using a time division multiple access protocol.

69. The system of claim 59 wherein the switch is configured to provide data packets containing data from the voice circuits with priority over data packets containing data from the data circuits.

70. A method comprising:
packetizing, data from voice circuits into data packets having an address responsive to a dial code on an associated voice circuit and packetizing data from a data circuit into data packets, the data packets having frame relay based elementary error detection and being assembled at each of three earth stations;

using a single hop satellite network to broadcast the data packets from each earth station directly to each of at least two other earth stations; and filtering and routing down-link directed data packets at each earth station based upon the contents of the data packets using a switch configured to support frame relay based protocols.

71. The method of claim 70 wherein packetizing data includes packetizing data using a frame-relay protocol based switch.

72. The method of claim 71 wherein packetizing data includes packetizing data based on a frame relay standard.

73. The method of claim 72 wherein packetizing data includes packetizing data in accordance with CCITT frame relay standards.

74. The method of claim 70 wherein packetizing data includes the use of a voice multiplexer to packetize data from the voice circuits.

75. The method of claim 74 including using the voice multiplexer to decode a data packet such that the address is used to direct associated data to a particular voice circuit dependent upon the address to thereby form virtual ports in the switch.

76. The method of claim 75 including using connectivity control software in the switch to dynamically configure the switch to provide multilayer addressing and filtering.

77. The method of claim 70 including communicating between the earth stations using a single carrier per channel protocol.

78. The method of claim 70 including communicating between the earth stations using a time division multiple access protocol.

79. The method of claim 70 including providing priority within the switch for data packets associated with the voice circuits over data packets associated with the data circuit.

80. A method comprising:
sending frame relay protocol based data packets directly from a first earth station to both second and third earth stations;

sending one relay protocol based data packets directly from the second earth station to both the first and third earth stations;

sending fame relay protocol based data packets directly from the third earth station to both the first and second earth stations;

assembling the frame relay protocol based data packets from both voice links and data links and configuring an address field of the packets from the voice links in response to a dial code on an associated voice link; and filtering and routing data packets received from a satellite based on contents of down link directed data packets.

81. The method of claim 80 wherein filtering includes discarding frames using a frame-relay protocol based switch.

82. The method of claim 80 wherein assembling includes assembling data packets based on a frame relay standard.

83. The method of claim 82 wherein assembling includes assembling data packets in accordance with CCITT frame relay standards.

84. The method of claim 80 wherein assembling includes using a voice multiplexer to assemble frame relay protocol based data packets from data on the voice links.

85. The method of claim 84 including using the voice multiplexer to decode a data packet to direct data associated with the data packet to a particular voice circuit dependent upon the address, thereby forming virtual ports.

86. The method of claim 80 including using connectivity control software to dynamically configure a switch to provide multilayer addressing and filtering.

87. The method of claim 80 including communicating between the earth stations using a single carrier per channel protocol.

88. The method of claim 80 including communicating between the earth stations using a time division multiple access protocol.

89. The method of claim 80 including using a switch to provide priority for data packets associated with voice circuits over data packets associated with data circuits.

90. A method comprising:
receiving at a first earth station data packets from at least two other earth stations via a single hop satellite network;
assembling data packets at the first earth station from data received from voice circuits and data circuits;
configuring an address in the data packets formed from the voice circuits responsive to a dial code on an associated voice circuit;
filtering and routing down-link directed data packets based on the contents of the data packets; and
configuring the data packets with elementary error detection using frame-relay base protocols.

91. The method of claim 90 wherein filtering and routing includes using a frame-relay protocol based switch.

92. The method of claim 90 wherein configuring the data packets includes configuring the data packets based on a frame relay standard.

93. The method of claim 92 wherein configuring the data packets includes configuring the data packets in accordance with CCITT frame relay standards.

94. The method of claim 90 wherein assembling includes the use of a voice multiplexer to assemble data from the voice circuits.

95. The method of claim 94 including using the voice multiplexer to decode a data packet such that the address is used to direct associated data to a particular voice circuit dependent upon the address to form virtual ports.

96. The method of claim 95 including using connectivity control software in the switch to dynamically configure the switch to provide multilayer addressing and filtering.

97. The method of claim 96 including communicating between the earth stations using a single carrier per channel protocol.

98. The method of claim 96 including communicating between the earth stations using a time division multiple access protocol.

99. The method of claim 95 including providing priority within the switch for data packets associated with the voice circuits over data packets associated with the data circuits.

100. In a first earth station, a method comprising:
receiving at a first earth station data packets broadcast from at least two other earth stations via a single hop mesh satellite network;
using a voice multiplexer to assemble frame relay protocol based data packets at the fist earth station from data received from voice circuits;
configuring an address in the data packets formed from the voice circuits responsive to a dial codes on an associated voice circuit;
using a switch to filter and route down link directed data packets based on the contents of data packets; and
sending to a satellite the frame relay protocol based data packets for broadcast to at least two other earth stations via the single hop mesh satellite network.

101. The method of claim 100 wherein the mesh satellite network has less than sixteen earth stations.

102. A first earth station for use in a system having at least two other earth stations interconnected via a single hop through a satellite wherein data from each earth station is broadcast to the other earth stations, the first earth station comprising:
means for receiving and transmitting signals to and from a satellite;
means for inputting the data from voice and data circuits, packetizing the data into data packets having a boundary flag, an address field responsive to a dial code, a data field, and a frame check sequence, and for discarding and routing down link directed data packets based on the contents of the data packets.

103. A system comprising a satellite, and first, second, and third earth stations interconnected via a single hop through the satellite and configured for broadcasting uplink directed data to the other earth stations, each earth station including means for inputting data from a plurality of terminal devices, packetizing the data into frame relay protocol based data packets having an address field responsive to a dial code and for filtering and routing down-link directed data packets based on the contents of the address field of the data packets.

104. A system comprising a satellite and first, second, and third earth stations interconnected via a single hop through the satellite, wherein the first earth station sends data packets to the second and third earth stations, the second earth station sends data packets to the first and third earth station, and the third earth station sends data packets to the first and second earth station, each earth station including at least two voice circuits each generating a dial code, a data circuit, and a switch configured for inputting data from the voice circuits, packetizing the data into data packets having a frame boundary flag, an address field responsive to one of the dial codes, a data field, and a frame check sequence, and discarding frames received from the satellite based on the contents of the down-link directed data packets, wherein the switch is configurable for supporting frame relay based protocols.

105. A method for use in a system having first, second, and third earth stations, the method comprising relaying frame relay data packets from the first earth station directly to the second and third earth stations and from the second earth station directly to the first and third earth station and from the third earth station directly to the first and second earth station, wherein relaying includes forming connectivity between terminal devices coupled to the first, second, and third earth stations, and wherein relaying includes using the contents of the frame relay packets to determine routing and filtering at each earth station.

106. The satellite of claim 105 wherein the system has less than sixteen earth stations.

107. A first earth station for use in a system having at least two other earth stations interconnected via a satellite wherein data from each earth stations is broadcast to the other earth stations, the first earth station comprising a data link, and a switch configured for packetizing data from data circuits into data packets, and filtering and routing down-link directed data packets based on the content of the data packets, wherein the switch packetizes the data packets using elementary error detection and is configurable to support frame relay based protocols.

108. The system of claim 107 wherein the switch is a frame-relay protocol based switch.

109. The system of claim 108 wherein the data packets are arranged based on a frame relay standard.

110. The system of claim 109 wherein the data packets are configured according to CCITT frame relay standards.

111. The earth station of claim 107 wherein the system has less than sixteen earth stations.

112. The system of claim 107 wherein the earth stations are configured to communicate using a single carrier per channel.

113. The system of claim 107 wherein the earth stations are configured to communicate using a time division multiple access protocol.

114. The system of claim 107 wherein the switch is configured to provide priority for data packets containing video data over data packets containing data from the data circuits.

115. A method comprising:
packetizing data from a data circuit into data packets, the data packets having frame relay based elementary error detection and being assembled at each of three earth stations;
using a satellite network to broadcast the data packets from each earth station directly to each of at least two other earth stations; and
filtering and routing down-link directed data packets at each earth station based upon the contents of the data packets using a switch supporting frame relay based protocols.

116. The method of claim 115 wherein packetizing data includes packetizing data using a frame-relay protocol based switch.

117. The method of claim 116 wherein packetizing data includes packetizing data based on a frame relay standard.

118. The method of claim 117 wherein packetizing data includes packetizing data in accordance with CCITT frame relay standards.

119. The method of claim 115 wherein there are less than sixteen earth stations.

120. The method of claim 115 including communicating between the earth stations using a single carrier per channel protocol.

121. The method of claim 115 including communicating between the earth stations using a time division multiple access protocol.

122. The method of claim 115 including providing priority within the switch for video data packets over data packets associated with the data circuit.

123. A method comprising:
sending frame relay protocol based data packets from a first earth station to both second and third earth stations;
sending frame relay protocol based data packets from the second earth station to both the first and third earth stations;
sending frame relay protocol based data packets from the third earth station to both the first and second earth station;
assembling the frame relay protocol based data packets from data links; and
filtering and routing data packets received from a satellite based on contents of down link directed data packets.

124. The method of claim 123 wherein filtering includes discarding frames using a frame-relay protocol based switch.

125. The method of claim 123 wherein assembling includes assembling data packets based on a frame relay standard.

126. The method of claim 125 wherein assembling includes assembling data packets in accordance with CCITT frame relay standards.

127. The method of claim 123 including using connectivity control software in a switch to dynamically configure the switch to provide multilayer addressing and filtering.

128. The method of claim 123 including communicating between the earth stations using a single carrier per channel protocol.

129. The method of claim 123 including communicating between the earth stations using a time division multiple access protocol.

130. The method of claim 123 including providing priority for video data packets over data packets associated with the data circuit.

131. A method comprising:
receiving at a first earth station data packets from at least two other earth stations via a satellite network;
assembling data packets at the first earth station from data received from data circuits;
filtering and routing down link directed data packets based on the contents of the data packets; and
configuring the data packets with elementary error detection using frame-relay based protocols.

132. The method of claim 131 wherein filtering and routing includes using a frame-relay protocol based switch.

133. The method of claim 131 wherein configuring the data packets includes configuring the data packets based on a frame relay standard.

134. The method of claim 133 wherein configuring the data packets includes configuring the data packets in accordance with CCITT frame relay standards.

135. The method of claim 131 including using connectivity control software in a switch to dynamically configure the switch to provide multilayer addressing and filtering.

136. The method of claim 131 wherein there are less than sixteen earth stations.

137. The method of claim 131 including communicating between the earth stations using a single carrier per channel protocol.

138. The method of claim 131 including communicating between the earth stations using a time division multiple access protocol.

139. The method of claim 131 including providing priority within the switch for video data packets over data packets associated with the data circuits.

140. In a first earth station, a method comprising:
receiving at a first earth station data packets broadcast from at least two other earth stations via a single hop mesh satellite network;
using a switch to filter and route down link directed data packets based on the contents of data packets; and
sending to a satellite frame relay protocol based data packets for broadcast to at least two other earth stations via the single hop mesh satellite network.

141. The method of claim 140 wherein the mesh satellite network has less than sixteen earth stations.

142. A first earth station for use in a system having at least two other earth stations interconnected via a satellite wherein data from each earth station is broadcast to the other earth stations, the first earth station comprising:
means for receiving and transmitting signals to and from a satellite;

means for inputting the data from data circuits, packetizing the data into data packets having a boundary flag, an address field, a data field, and a frame check sequence, and for discarding and routing down link directed data packets based on contents of the data packets.

143. The first earth station of claim 142 wherein the system has less than sixteen earth stations.

144. A system comprising a satellite, and first, second, and third earth stations interconnected via the satellite and configured for broadcasting uplink directed data to the other earth stations, each earth station including means for inputting data from a plurality of terminal devices, packetizing the data into frame relay protocol based data packets having an address field for filtering and routing down-link directed data packets based on the contents of the address field of the data packets.

145. A system comprising a satellite and first, second, and third earth stations interconnected via the satellite, wherein the first earth station sends data packets to the second and third earth stations, the second earth station sends data packets to the first and third earth station, and the third earth station sends data packets to the first and second earth station, each earth station including at least two voice circuits each generating a dial code, a data circuit, and a switch configured for inputting data from the voice circuits, packetizing the data into data packets having a frame boundary flag, an address field, a data field, and a frame check sequence, and discarding frames received from the satellite based on the contents of the down-link directed data packets, wherein the switch is configurable for supporting frame relay based protocols.

146. A method comprising:
relaying a first group of frames containing digital voice and a second group of frames containing digital data from a first earth station to second and third earth stations through a satellite;
relaying a third group of frames containing digital voice and a fourth group of frames containing digital data from the second earth station to the first and third earth stations through the satellite;
relaying a fifth group of frames containing digital voice and a sixth group of frames containing digital data from the third earth station to the first and second earth stations through the satellite;
determining, at the first earth station, first frames of the third and fourth groups of frames that are addressed to end terminal devices of the third earth station, and discarding the first frames;
determining, at the first earth station, second frames of the fifth and sixth groups of frames that are addressed to end terminal devices of the second earth station, and discarding the second frames;
determining, at the second earth station, third frames of the first and second groups of frames that are addressed to the end terminal devices of the third earth station, and discarding the third frames;
determining, at the second earth station, fourth frames of the fifth and sixth groups of frames that are addressed to end terminal devices of the first earth station, and discarding the fourth frames;
determining, at the third earth station, fifth frames of the first and second groups of frames that are addressed to the end terminal devices of the second earth station, and discarding the fifth frames; and
determining, at the third earth station, sixth frames of the third and fourth groups of frames that are addressed to the end terminal devices of the first earth station, and discarding the sixth frames,
whereby processing load is reduced and routing efficiency is increased so that bidirectional voice and data signaling capability is achieved between the end terminal devices of the first, second, and third earth stations.

147. A method for an earth station configured to communicate with at least two other earth stations via a satellite, to provide conditional access by a terminal coupled to the earth station to input frames each having an address, the method comprising the steps of:
receiving a frame relay based frame from the satellite;
determining the address from the frame;
comparing at least a portion of the address with predetermined data; and
either discarding the frame, or processing and transmitting the frame to the terminal through an interface, depending upon a result of the step of comparing, thereby creating an efficient satellite network.

148. The method of claim 147, wherein the step of receiving includes receiving the frame having a format based on a frame relay format.

149. The method of claim 147, wherein the step of comparing includes comparing the at least a portion of the address with the predetermined data comprising a bit mask.

150. The method of claim 147, wherein the step of comparing includes comparing a portion of the address less than an entirety of the address with the predetermined data.

151. The method of claim 147, wherein the step of transmitting includes transmitting the frame through the interface comprising a virtual port of a frame relay switch.

152. A method for an earth station configured to communicate with at least two other earth stations via a satellite, to provide conditional access by a terminal coupled to the earth station to input data, and to process the input data, the method comprising the steps of:
receiving a frame from the satellite;
if the input data contains frames, for each frame:
determining an address of the frame,
comparing at least a portion of the address with predetermined data, and
either discarding the frame or processing the frame into output data depending upon a result of the step of comparing; and
if the input data contains computer data:
processing the computer data into output data, and
transmitting the output data to the terminal via an interface, thereby creating an efficient satellite network.

153. The method of claim 152, wherein the step of receiving includes receiving the frame having a format based on a frame relay format.

154. The method of claim 152, wherein the step of comparing includes comparing the at least a portion of the address with the predetermined data comprising a bit mask.

155. The method of claim 152, wherein the step of comparing includes comparing a portion of the address less than an entirety of the address: with the predetermined data.

156. The method of claim 152, wherein the step of transmitting includes transmitting the frame through the interface comprising a virtual port of a frame relay switch.

157. An earth station configured to communicate with at least two other earth stations via a satellite, for providing conditional access by a terminal coupled to the earth station to input frames each having an address, the earth station comprising:

a receiver for receiving a frame from the satellite;

a switch for determining the address of the received frame, comparing at least a portion of the address with predetermined data, and either discarding the frame or processing the frame into output data depending upon a result of the step of comparing; and an interface for transmitting the output data to the terminal, thereby creating an efficient satellite network.

158. The method of claim 157, wherein the frame has a format based on a frame relay format.

159. The method of claim 157, wherein the predetermined data comprises a bit mask.

160. The method of claim 157, wherein the portion of the address is less than an entirety of the address.

161. The method of claim 157, wherein the interface comprises a virtual port of the switch.

162. A method of transmitting data in the form of packets in a satellite communication system, the method comprising the steps of:

transmitting a packet having a destination address from a first earth station to a satellite;

transmitting the packet from the satellite to a second earth station that includes a packet switch coupled to a first terminal device having a first device address;

transmitting the packet from the satellite to a third earth station;

comparing at the second earth station at least a portion of the destination address to at least a portion of the first device address; and processing the packet with the packet switch when the at least portion of the destination address corresponds to at least a portion of the first device address.

163. The method of claim 162, wherein the third earth station includes a packet switch coupled to a plurality of second terminal devices having device addresses and further including the steps of:

determining at the third earth station that the at least portion of the destination address does not correspond to any portions of the second device addresses; and discarding the packet.

* * * * *